Jan. 15, 1957 W. C. MALLISON 2,777,832
CONTINUOUS PROCESS FOR THE POLYMERIZATION OF ACRYLONTRILE
Filed May 22, 1951
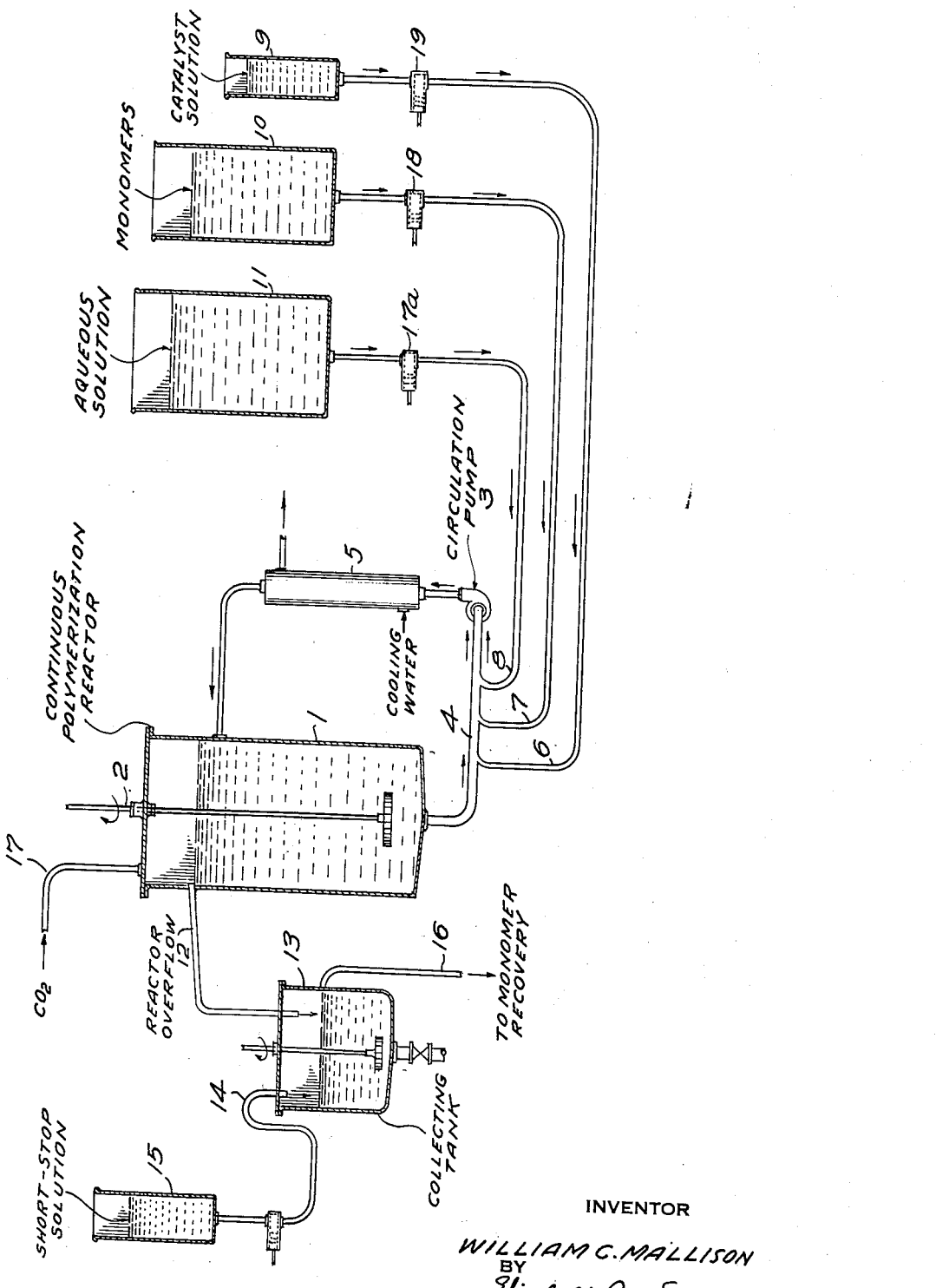
INVENTOR
WILLIAM C. MALLISON
BY
ATTORNEY United States Patent Office 2,777,832
Patented Jan. 15, 1957

2,777,832

CONTINUOUS PROCESS FOR THE POLYMERIZATION OF ACRYLONITRILE

William Charles Mallison, Stamford, Conn., assignor to American Cyanamid Company, New York, N. Y., a corporation of Maine Application May 22, 1951, Serial No. 227,643

19 Claims. (Cl. 260—80.5)

This invention relates to the polymerization of acrylonitrile and more particularly, to a new process for preparing polymers and copolymers of acrylonitrile.

Polymers of acrylonitrile and its copolymers with other polymerizable organic compounds containing at least one ethylenic double bond are, of course, known. These polymers and copolymers have achieved wide use in the production of many valuable commercial products as, for example, synthetic rubber and more recently, artificial fibers.

Difficulties have been encountered in the polymerization or copolymerization of acrylonitrile, and considerable effort has been spent in the development of practicable commercial processes for preparing these extremely useful polymers and copolymers. Recent developments in the polymerization of acrylonitrile have been concerned largely with polymerization in aqueous media, such as described in U. S. Patent No. 2,135,443, and with redox catalysis which gives high yields of polymer in a short time at moderate temperatures. The color of the polymer has been good, and molecular weights have been in the desired range.

It is an object of the present invention to provide a new and improved process for preparing polymers and copolymers of acrylonitrile.

It is another object of the present invention to provide a continuous process for the polymerization of acrylonitrile and the copolymerization of acrylonitrile with up to about 15% of a different polymerizable, water-soluble ethylenic compound.

It is a further object of the present invention to produce acrylonitrile polymers and copolymers of superior physical properties.

Still another object of the present invention is the provision of a method for polymerizing or copolymerizing acrylonitrile in which the conversion of monomer to polymer in a given reaction time is improved.

A further object of the present invention is the provision of a continuous process for the solution polymerization or copolymerization of acrylonitrile.

It is a very important object of the present invention to provide a process for producing polymers or copolymers of acrylonitrile having a narrow molecular weight range as well as consistently constant physical properties.

Another object of the present invention is the provision of an economical, practicable method for producing polymers or copolymers of acrylonitrile.

The above and other objects are attained by the continuous polymerization or copolymerization of acrylonitrile in the presence of a relatively large constant quantity of polymer.

The invention will be described in greater detail in conjunction with the following specific examples.

*Example 1*

A cylindrical glass reactor having a volume of about 1600 ml. and containing depressions on the side and bottom which serve as baffle plates is supplied with a propeller-type stirrer driven by a motor rotating at approximately 1600 R. P. M. The reactor is also equipped, at a point half-way between its top and bottom, with a glass discharge tube. The reactor is placed in a water bath, the temperature of which is controlled by a copper coil through which ice water is pumped intermittently.

1600 grams of a water slurry containing 28% polyacrylonitrile prepared in a previous similar reaction is charged to the reactor, adjusted to about pH 3 with sulfuric acid, and its temperature is brought to 35° C. A stream of acrylonitrile containing 3.1% water is introduced into the reactor through an annular space around the propeller shaft of the stirrer. A second stream comprising an aqueous solution containing 0.377 gram of sodium chlorate and 1.35 grams of sodium sulfite per 100 grams of acrylonitrile, i. e., 2.93 g. sodium chlorate and 10.5 g. sodium sulfite per liter of water, and a third stream comprising an aqueous solution of sulfuric acid containing 0.64 gram of acid per 100 grams of acrylonitrile, i. e., 5.0 g. per liter of water, are fed onto the surface of the reaction mixture in the reactor. Each of the feed streams are run continuously at a rate of 236 ml. per hour, resulting in a 27.9% monomer concentration in the feed and an average residence time of 2.2 hours.

The temperature of the reactants is maintained at about 35° C., and the polymer formed is discharged by overflow through the discharge tube in the reactor. After 7.5 hours the pH of the reaction mixture is 2.5, and an 89% yield of a polymer having an average molecular weight of about 75,000 is obtained.

*Example 2*

The procedure of Example 1 is followed. The first feed stream consists of acrylonitrile containing 3.1% water; the second feed stream consists of a solution containing 1.68 grams of ammonium persulfate per 100 grams of acrylonitrile, i. e., 13.0 g. per liter of water; the third feed stream comprises a solution containing 0.69 gram of sodium metabisulfite per 100 grams of acrylonitrile, i. e., 5.35 g. per liter of water.

After six hours a 92.6% yield of a polymer having an average molecular weight of about 71,200 is obtained.

*Example 3*

The procedure of Example 2 is followed except that the feed rates are 400 ml. per hour and 0.84 gram of ammonium persulfate and 1.7 grams of sodium metabisulfite per 100 grams of acrylonitrile, i. e., 3.84 g. of persulfate and 7.78 g. of metabisulfite per liter of water, are used.

After 4.3 hours the pH of the reaction mixture is 3.6, and an 88% yield of a polymer having an average molecular weight of 169,000 is obtained.

*Example 4*

The procedure of Example 1 is followed except that the temperature is maintained at 60° C.

After 8.75 hours the pH of the product is 2.6, and a 76.5% yield of a polymer having an average molecular weight of 57,600 is obtained.

*Example 5*

The procedure of Example 1 is followed. The first feed stream is of acrylonitrile containing 3.1% water. The second feed stream contains 5 grams of allylamine per 95 grams of acrylonitrile, i. e., 40.8 g. per liter of water, 1.03 equivalents of sulfuric acid per mol of allylamine, i. e., 36.3 g. per liter of water, and 1.63 grams of ammonium persulfate per 100 grams of acrylonitrile, i. e., 12.6 g. per liter of water. The third feed stream contains 0.34 gram of sodium metabisulfite per 100 grams of acrylonitrile, i. e., 2.64 g. per liter of water.

Each of the streams is introduced into the reactor at the rate of 236 ml. per hour giving a residence time of 2.4 hours.

After 10.5 hours the pH of the product is 3.5, and a 69.2% yield of a copolymer having an average molecular weight of about 69,700 is obtained. The polymer concentration in the reactor when the polymerization reached a steady state was about 19%.

The following examples are conducted in an apparatus such as is illustrated by the single figure of the accompanying drawing. This apparatus consists of a stainless steel cylindrical reactor 1 having a working volume of about 15 gallons. This reactor is equipped with a radial turbine-type agitator 2. A stainless steel centrifugal circulation pump 3 serves to withdraw material from the bottom of the reactor through a one-inch suction line 4 and force it through a water-cooled stainless steel heat exchanger 5 back into the reactor 1 at a point beneath the surface of its contents. Feed streams 6, 7 and 8 from tanks 9, 10, and 11, respectively, to the reactor 1 are pumped into the suction line 4 of the circulation pump 3.

The reactor 1 is equipped with a gravity overflow connection 12 to a collecting tank 13 whereby a constant operating level is maintained in the reactor. Material collected in tank 13 may be held there in the absence of air or run off into another vessel or series of vessels for further polymerization; it may be taken as the final product with no additional treatment, or it may be treated to halt the polymerization process before complete conversion of the monomer and/or to recover unconverted monomer. The latter alternative is illustrated in the drawing where means 14 is provided for introducing a short-stop solution, e. g., alkali, from tank 15 into collecting tank 13, and means 16, for withdrawing slurry for purposes of monomer recovery.

An inert gas such as carbon dioxide is introduced into the reactor at 17 to provide an inert atmosphere.

In the operation of this apparatus an aqueous slurry of previously prepared polymer is charged to the reactor 1 where, with agitation, it is circulated and heated to the desired temperature. The slurry is then deaerated in any desired manner as, for example, by the addition of chips of Dry Ice, and if necessary the pH is adjusted by addition of sulfuric acid.

The several metering pumps 17a, 18, and 19 supplying the feed components 6, 7, and 8, respectively, are then started and, after adjustment to the necessary ratio, allowed to pump steadily throughout the run.

The system is maintained at a constant temperature by adjustment of the cooling water to the heat exchanger 5 in the circulation system.

When the system has been running over a period of time such that several reactor volumes have been discharged through the overflow 12 under essentially constant conditions, it is judged that a state of equilibrium has been obtained and samples are taken for determination of monomer conversion, average molecular weight of polymer, etc.

Example 6

The following conditions are realized in carrying out the above-described general procedure in the illustrated apparatus.

Feeds:
- Aqueous (0.3% $H_2SO_4$) _____lbs./hr__ 49.3
- Catalyst (15.0% $Na_2SO_3$, 4.22% $NaClO_3$ water solution) _____lbs./hr__ 2.25
- Monomer (97% acrylonitrile, 3% water) lbs./hr__ 25.9
- Reaction temperature _____° C__ 35
- Reaction duration (approx.) _____hrs__ 9
- Residence time _____hrs__ 1.69

Reaction is terminated by shutting off all feed pumps and adding sufficient 10% sodium carbonate solution to the contents to bring the reactor pH to about 9 as quickly as possible. 131 lbs. of slurry are drained from the reactor and filtered in a 24-inch centrifuge. This produces 65 lbs. of centrifuge cake having a water content of 41%, representing a 90.0% conversion. The polymer has an average molecular weight of about 75,000.

Example 7

The procedure described above for the illustrated apparatus is repeated under the following conditions:

Feeds:
- Aqueous (0.25% $H_2SO_4$) _____lbs./hr__ 41.8
- Catalyst (15.0% $Na_2SO_3$, 4.22% $NaClO_3$ water solution) _____lbs./hr__ 2.32
- Monomer (95% acrylonitrile 5% methyl acrylate mixture containing 3% water) lbs./hr__ 26.03
- Reaction temperature _____° C__ 36.5
- Reaction duration (approx.) _____hrs__ 15
- Residence time _____hrs__ 1.85

All of the reactor overflow from the beginning to the end of this run is centrifuged yielding 621 lbs. of wet cake which is equivalent to 391 lbs. of dry copolymer including 37 lbs., on a dry basis, of seed polymer added at the beginning of the run. The net dry polymer production of 354 lbs. is obtained from a net monomer feed of 389 lbs. which represents a 91% conversion. The average molecular weight of the copolymer is about 78,600.

Example 8

The procedure described above in conjunction with the illustrated apparatus is carried out under the following conditions:

Feeds:
- Water _____lbs./hr__ 43.0
- Catalyst I (2.12% $Na_2S_2O_5$ water solution) lbs./hr__ 1.83
- Catalyst II (10.00% $(NH_4)_2S_2O_8$ water solution) _____lbs./hr__ 1.85
- Monomer (95% Acrylonitrile 5% methyl acrylate mixture containing 2% water) lbs./hr__ 25.45
- Reaction temperature _____° C__ 35.3
- Reaction duration (approx.) _____hrs__ 13½
- Approx. residence time _____hr__ [1] 1.97

[1] Reactor volume at overflow level slightly greater than in previous examples.

A 96.4% conversion to a copolymer having an average molecular weight of about 167,000, based on the final reactor material only, is obtained.

It will be noted in the above examples (Examples 1–8) that the concentration of monomer in the feed is from about 28% in Examples 1–5 up to about 36% in Examples 7. Monomer concentrations of this order of magnitude produce substantially constant quantities of polymer in the polymerization zone of the order of about 19% (Example 5) to about 33% (Example 8) by weight of the total polymer suspension therein. The amount of monomer concentration in the polymerization zone with the above-described polymer suspension is equal to from between about 1.3% of the total polymer suspension, as in Example 8, to about 8.5%, as in Example 5.

Polymer used in the preceding examples for seeding will, of course, vary depending upon the conditions under which it is produced. If it is generated in situ by starting the operation as a batch process or if, previously prepared, it differs considerably in properties such as molecular weight from the desired polymer product, my continuous polymerization process should be allowed to proceed until both the seed polymer has been purged and a steady state or equilibrium is set up before any polymer product is collected. Thus, in Examples 6 and 8 only the reactor contents are considered to be representative of steady state conditions and the overflow material is discarded. Such a run is useful for collecting data.

When, as in Example 7, however, the seed polymer is known to be approximately equivalent to desired polymer produced under steady state conditions and a steady state can be established quickly, then all polymerized material, from overflow and from reactor, is collected. Such a run is, of course, an ideal production run.

*Example 9*

7.1 parts of a copolymer of 95% acrylonitrile and 5% methyl acrylate having an average molecular weight of about 82,000 are dissolved in 92.9 parts of 48.5% aqueous calcium thiocyanate solution. During mixing and subsequent operations the solution is blanketed by nitrogen. The solution, which has a pH of 6.1, is filtered and then held under vacuum until free of bubbles. The viscosity of the solution, as measured by the time for a ⅛″ diameter Monel ball to fall 20 cm. through the solution at 61° C., is 27.6 seconds.

The polymer solution is heated in a steam-heated spinning head as disclosed in the copending application of Arthur Cresswell, Serial No. 201,823 filed December 20, 1950, and now abandoned, and then extruded through a spinnerette having 40 holes of 90 microns diameter into water at 0° C. The coagulated multifilament thread is led through a cold coagulating bath for a distance of 13 feet, then to a godet which stretches the cold gel thread 25%. The gel thread is then led through a stretch bath of water at 99° C. and thence to a second godet, which imparts an additional stretch of 700%. From this second godet the thread is led to a pair of convergent heated drying roll under such tension that the total stretch applied to the thread between the coagulating bath and the drying rolls is 880%. Before drying the thread is treated with a 1% dispersion of the diguanidinium salt of mono-octadecyl sulfonsuccinate as disclosed in the copending application of Joseph J. Carnes et al., Serial No. 175,296 filed July 21, 1950, now Patent No. 2,652,348, dated September 15, 1953. The dry thread as delivered by the drying rolls is passed through a heated slot at 550° F. and allowed to retract 11.2% as disclosed in the copending application of Arthur Cresswell and Irvin Wizon, Serial No. 97,786 filed June 8, 1949, now Patent No. 2,558,733, dated July 3, 1951. The thread thereafter is ring-twisted 8.9 turns per inch and wound on a bobbin.

The finished multi-filament thread has the following characteristics:

| Denier | Tenacity, grams per denier | | Elongation, Percent | |
|---|---|---|---|---|
| | Dry | Wet | Dry | Wet |
| 91 | 4.94 | 5.01 | 14 | 15 |

The average molecular weights given in the preceding examples and elsewhere in the present specification and claims are obtained by multiplying the viscosity in cps. of a 1% solution in aqueous (60%) sodium thiocyanate at 40° C. as measured on an Ostwald-Fenske viscosimeter by a factor of 3500. This gives a result substantially identical with that obtained from a Staudinger equation as given in U. S. Patents 2,404,713 and 2,426,719.

My invention is primarily directed to the polymerization of acrylonitrile and to the copolymerization of acrylonitrile with up to about 15% by weight of other monoethylenically unsaturated compounds which are copolymerizable therewith and which are water-soluble to the extent of at least about 1%. If the copolymer is destined for fiber spinning as in Example 9, co-monomers which impart particularly desirable properties to the spun fiber, i. e., increased hydrophilic characteristics, greater affinity for dyestuffs, etc., such as hydroxyethyl methacrylate, methylacrylate, allyl alcohol, methyl vinyl ketone, allyl amine, the aminostyrenes, vinyl pyridine, amino alcohol esters of acrylic, methacrylic, fumaric and maleic acids, acid salts of the foregoing amino compounds, and the like, are preferably selected.

However, my invention contemplates broadly the use as a co-monomer of any polymerizable, monoethylenically unsaturated compound, regardless of its water-solubility, which can be incorporated in a reaction slurry in the desired quantity (not more than about 15%) without causing separation of an additional monomer phase under reaction conditions. Absolute water-solubility of the co-monomer is not a critical factor because the co-monomer is present in an acrylonitrile solution containing solid polymer dispersed therein. Thus, a co-monomer which is not sufficiently soluble in water may be in an acrylonitrile solution. Moreover, I believe that some monomer and/or co-monomer is adsorbed on the polymer surfaces. Accordingly, operative co-monomers may be selected from the group of monoethylenically unsaturated compounds including styrene, alkyl-substituted styrenes as the o-, m- and p-methyl styrenes, alpha, para-dimethyl styrene, 2,4-dimethyl styrene, etc., acrylamide, methacrylamide, methacrylonitrile, acrylic acid, methacrylic acid, alkyl esters and salts of acrylic and methacrylic acids, vinyl acetate, monoallyl phthalate, and the like. Mixtures of two or more co-monomers may, of course, also be used. It will be noted that some of these compounds are water-soluble and some are water-insoluble.

I have found, according to my process, that polymerization must be effected in the presence of a relatively large, substantially constant quantity of the polymer to be produced, this quantity being an amount of from about 10% to 40% of the weight of the reaction mixture. Polymer concentration markedly influences both the reaction rate and the physical characteristics of the polymer produced. Thus, my process results in an increased polymerization rate and yield, and there is little, if any, monomer to recover particularly if a second polymerization stage, which may consist in merely holding for a time in the absence of air, is provided. The process is economical because of the higher output from any given size equipment or, conversely, it is an advantage of my process that it permits use of smaller equipment than required in, for example, batch processes, to produce the same amount of polymer.

Relatively low polymerization temperatures ranging from about 20° to about 70° C. are desirable. I prefer polymerization at a temperature of about 30° to about 40° C.

It is desirable to conduct the process of the present invention in the absence of oxygen which has a definite inhibiting effect on the polymerization. Suitable inert gases such as nitrogen and carbon dioxide may be used to displace air in the reaction zone.

My process is not limited to the use of any particular polymerization catalyst although those oxygen-containing catalysts which are at least somewhat water-soluble are definitely preferred. The ideal catalyst is one which will bring about a high conversion of monomer in a short time at about 35° C. since otherwise the monomer concentration builds up and causes gelation. I have obtained excellent results using redox catalyst systems such as the chloric acid-bisulfite system described and claimed in the co-pending application of Arthur Cresswell, Serial No. 208,979 filed February 1, 1951, now Patent No. 2,751,374, dated June 19, 1956, and those systems comprising peroxy compounds and sulfoxy compounds such as the ammonium persulfate and sodium bisulfite catalyst described in U. S. Patents Nos. 2,436,926 and 2,462,354. While some catalyst components may be mixed and fed as one solution, it may be desirable or necessary to use two separately metered catalyst solutions. The examples illustrate both methods.

Various modifiers, such as catalyst promoters and chain transfer agents may be added. Iron, copper and silver, present in the form of a soluble salt in very small amounts of the order of 2–50 parts per million, are particularly desirable, especially in conjunction with a chloric acid-bisulfite catalyst, since they increase the rate of polymerization. Mercaptans which are sufficiently water-soluble but not too volatile as for example, lauryl and dodecyl mercaptans, also tend to increase the polymerization rate and at the same time their use results in the production of a polymer of lower molecular weight. The polymer molecular weight can also be decreased by use of alcohols such as allyl alcohol, isopropanol, and the like.

It is an advantage of my process that with certain catalyst formulations only about 25%–50% of the quantity of catalyst required in prior art batch processes for polymerizing acrylonitrile is required to get polymers of comparable molecular weights. The reaction mixtures therefore possess better heat stability, and the color of the polymer is improved.

Perhaps the most striking improvement realized by my new continuous process for polymerizing acrylonitrile is the production of fluid slurries of polymer which can be pumped and handled at high solids of the order of 35% to 40%. Moreover, these slurries can be centrifuged to a low water content of the order of 25% to 35% and dissolved directly in thiocyanate if the polymer is destined for fiber spinning. In corresponding batch processes a slurry containing only about 7% solids is thick and difficult to handle. Moreover, when it is centrifuged, the centrifuge cake contains about 80% water and is not useable directly for solution in thiocyanate preparatory to spinning.

I do not wish to be limited to any particular theory but I believe that this remarkable difference in the physical properties of polymers is a result of the actual structure of the polymer. When observed and studied under a microscope, acrylonitrile polymers and copolymers produced by prior art batch processes possess a loose lacey structure whereas similar polymers or copolymers prepared by my process are in the form of extremely compact rounded discrete particles.

There is, of course, a definite relationship between the critical features of my process and the production of the desired end product, namely, a fluid slurry of high solids content. Agitation is one important factor. The fluid slurries obtained by my process are fluid only when subjected to agitation and conversely, agitation must be sufficient to maintain fluidity of the polymer suspension. When allowed to stand the slurries become thick. Thus, if dead spots occur anywhere in the reactor, thickening commences, removal of heat of polymerization is prevented locally and the entire mass soon solidifies. The amount of agitation required cannot be specified except by reference to a given reactor. It should be sufficient to produce turbulence, preferably without splashing, and to subject each portion of the mass periodically to intense shearing.

Large amounts of polymer fines in suspension give stiff slurries and it is important to keep most of the particles in the size range of about 10 to 50 microns. This can be controlled by maintaining constant feeds, constant temperature, and the like. Agitation is also a factor in controlling the polymer particle size but alone it will not overcome the effect of particles which are below the preferred size range.

It has been pointed out above that polymerization may be carried out over a range of about 20° to about 70° C. The temperature should, however, not be allowed to rise rapidly for any reason, i. e., it should be substantially constant, or thickening of the slurry will result. Thus, polymerization can be carried on at 30° C. or at 60° C. with satisfactory results but it is not desirable to start at one temperature and change abruptly and rapidly to the other in the middle of the run.

Monomer concentration in the reaction mixture should be kept low since slurries tend to thicken when it is high. This factor is substantiated by the following data obtained from synthetic mixtures:

| Parts by Weight | | | Slurry |
| --- | --- | --- | --- |
| Polymer | Monomer | Water | |
| 30 | 9 | 70 | Fluid. |
| 30 | 10 | 60 | Sl. less fluid. |
| 30 | 20 | 50 | Thick paste. |
| 35 | 0 | 65 | Fluid. |
| 35 | 10 | 55 | Fairly fluid. |
| 20 | 10 | 70 | Fluid, rapid phase separation. |

In practice, other changes, for example particle size, occur in the system when the monomer concentration builds up and its effect on the fluidity of the slurry becomes magnified. In general, the monomer concentration in the reaction mixture should be kept constant within the range of from about 1% to about 10%. If desired, the polymer slurry produced by my process may be run into a holding tank or a series of holding tanks and there further polymerized by exclusion of air and, where necessary, by the addition of more catalyst. In any such additional polymerization stage the monomer concentration in the reaction mixture may well be below 1%.

My polymerization process is carried out in aqueous solution or dispersion in the absence of any substantial quantity of surface active agent, i. e., less than that quantity which would produce an emulsion of the reaction slurry under the reaction conditions. It is desirable in any event, when preparing polymers or copolymers of acrylonitrile for fiber spinning, to avoid the complications of removing such an agent from the polymer compositions before spinning. However, there may be instances where the addition of small amounts of such agents is desirable or even necessary to obtain a given desired result.

The aqueous reaction mixture should have a pH of from about 1 to 4, preferably from about 2 to 3, which pH is maintained by the addition of acid in the aqueous feed stream or, if desired, the acid may be added as a separate feed stream with the other components of the reaction mixture. When redox catalyst systems are employed, these pH ranges have given excellent results.

Fillers, dyes, pigments, plasticizers, other resins, both natural and synthetic, and the like may be incorporated with the polymers and copolymers prepared by my process either before, during or after polymerization to render the products more suitable for whatever use they are to be put, i. e., molding and surface coating compositions, adhesives, fibers, etc.

For the preparation of acrylonitrile polymers or copolymers to be used in the preparation of spun fibers, a uniform average molecular weight of between about 60,000 and 90,000 has been found to be most desirable. It is a great advantage of my new process that by continuous operation in the presence of a constant quantity of polymer, a polymer of uniform average molecular weight can be obtained.

When in the claims, "polymerization" of acrylonitrile is recited, the term is intended to cover copolymerization of acrylonitrile with other polymerizable monomers, i. e., co-monomers, to form copolymers just as it obviously covers polymerization of acrylonitrile, in the more restricted sense, to produce homopolymers of acrylonitrile.

It will, of course, readily appear that in a continuous process for polymerization according to the present invention, where the polymerization zone contains amounts of from between 10 and 40% polymer and 1 and 10% monomer that a feed sufficient to maintain such a composition under steady state must necessarily contain a minimum of 11% monomer and a maximum of 50% monomer. This is clearly illustrated by Examples 1–8 wherein the sum of the polymer concentration in the polymerization zone and the monomer concentration therein is equal to the concentration by weight of monomer in the feed to said zone.

I claim:

1. A process for producing a polymer which comprises continuously feeding, for polymerization, acrylonitrile with up to about 15% by weight of a different monoethylenically unsaturated compound, copolymerizable therewith, into an agitated polymerization zone, said polymerization occurring in the presence of a polymerization catalyst, said zone being an aqueous polymer suspension having a monomer concentration of from about 1 to 10% and a substantially constant quantity of polymer in the form of compact rounded discrete particles, said quantity being an amount of from about 19 to 40% of the weight of the suspension, said zone being maintained under substantially steady state conditions, including a substantially constant temperature within the range of about 20° C. to 70° C., the concentration of monomer in the feed being such as to maintain the amount of monomer and polymer in the polymerization zone substantially constant.

2. A process for producing a polymer which comprises continuously feeding, for polymerization, acrylonitrile with up to about 15% by weight of a different monoethylenically unsaturated compound, copolymerizable therewith, into an agitated polymerization zone, said polymerization occurring in the presence of a polymerization catalyst, said zone being an aqueous polymer suspension having a monomer concentration of from about 1 to 10% and a substantially constant quantity of polymer in the form of compact rounded discrete particles, said quantity being an amount of from about 19 to 40% of the weight of the suspension, said zone being maintained under substantially steady state conditions, including a substantially constant temperature within the range of about 20° C. to 70° C., the concentration of the monomer in the feed being between about 28 and about 36% of the total weight of the continuous feed.

3. A process for producing a polymer which comprises continuously feeding, for polymerization, acrylonitrile with up to about 15% by weight of a different monoethylenically unsaturated compound, copolymerizable therewith, into an agitated polymerization zone, said polymerization occurring in the presence of a reduction-oxidation polymerization catalyst comprising a water-soluble peroxy compound and a water-soluble sulfoxy compound, said zone being an aqueous polymer suspension having a monomer concentration of from about 1 to 10% and a substantially constant quantity of polymer in the form of compact rounded discrete particles, said quantity being an amount of from about 19 to 40% by weight of the suspension, said zone being maintained under substantially steady state conditions, including a substantially constant temperature within the range of about 20° C. to 70° C., the concentration of monomer in the feed being such as to maintain the amount of monomer and polymer in the polymerization zone substantially constant.

4. A process for producing a polymer which comprises continuously feeding, for polymerization, acrylonitrile with up to about 15% by weight of a different monoethylenically unsaturated compound, copolymerizable therewith, into an agitated polymerization zone, said polymerization occurring in the presence of a polymerization catalyst comprising chloric acid and an acid selected from the group consisting of sulfurous acid and hydro-sulfurous acid, said zone being an aqueous polymer suspension having a pH between about 1 and 4, a monomer concentration of from about 1 to 10% and a substantially constant quantity of polymer in the form of compact rounded discrete particles, said quantity being an amount of from about 19 to 40% of the weight of the suspension, said zone being maintained under substantially steady state conditions, including a substantially constant temperature within the range of 20° C. to 70° C., the concentration of monomer in the feed being such as to maintain the amount of monomer and polymer in the polymerization zone substantially constant.

5. A process for producing a polymer which comprises continuously feeding, for polymerization, acrylonitrile with up to about 15% by weight of a different monoethylenically unsaturated compound, copolymerizable therewith, into an agitated polymerization zone, said polymerization occurring in the presence of a polymerization catalyst comprising chloric acid and an acid selected from the group consisting of sulfurous acid and hydro-sulfurous acid, said zone being an aqueous polymer suspension having a pH between from about 2 to 3, and a monomer concentration of from about 1 to 10%, and a substantial quantity of polymer in the form of compact rounded discrete particles, said quantity being an amount of from about 19 to 40% of the weight of the suspension, said zone being maintained under substantially steady state conditions, including a substantially constant temperature within the range of 20° C. to 70° C., the concentration of the monomer in the feed being between about 28 and about 36% of the total weight of the continuous feed.

6. A process for producing a polymer which comprises continuously feeding, for polymerization, acrylonitrile with up to about 15% by weight of a different monoethylenically unsaturated compound, copolymerizable therewith, into an agitated polymerization zone, said polymerization occurring in the presence of a polymerization catalyst comprising chloric acid and an oxidizable sulfoxy compound, said zone being an aqueous polymer suspension having a pH between about 1 and 4 and containing between about 2 and 50 parts per million of iron in solution, a monomer concentration of from about 1 to 10% and a substantially constant quantity of polymer in the form of compact rounded discrete particles, said quantity being an amount of from about 19 to 40% of the weight of the suspension, said zone being maintained under substantially steady state conditions, including a substantially constant temperature within the range of 20° C. to 70° C., the concentration of monomer in the feed being such as to maintain the amount of monomer and polymer in the polymerization zone substantially constant.

7. A process for producing a polymer which comprises continuously feeding, for polymerization, acrylonitrile into an agitated polymerization zone, said polymerization occurring in the presence of a polymerization catalyst, said zone being an aqueous polymer suspension having a monomer concentration of from about 1 to 10% and a substantially constant quantity of polymer in the form of compact rounded discrete particles, said quantity being an amount of from about 19 to 40% by weight of the suspension, said zone being maintained under substantially steady state conditions, including a substantially constant temperature within the range of about 20° C. to 70° C., the concentration of monomer in the feed being such as to maintain the amount of monomer and polymer in the polymerization zone substantially constant.

8. A process for producing a polymer which comprises continuously feeding, for polymerization, acrylonitrile into an agitated polymerization zone, said polymerization occurring in the presence of a catalyst comprising chloric acid and an acid selected from the group consisting of sulfurous acid and hydro-sulfurous acid, said zone being an aqueous polymer suspension having a pH between about 1 and 4, a monomer concentration of from about 1 to 10%, and a substantially constant quantity of polymer in the form of compact rounded discrete particles, said quantity being an amount of from about 19 to 40% by weight of the suspension, said zone being maintained under substantially steady state conditions, including a substantially constant temperature within the range of about 20° C. to 70° C., the concentration of monomer in the feed being such as to maintain the amount of monomer and polymer in the polymerization zone substantially constant.

9. A process for producing a polymer which comprises continuously feeding, for polymerization, acrylonitrile into an agitated polymerization zone, said polymerization occurring in the presence of a catalyst comprising chloric acid and an acid selected from the group consisting of sulfurous acid and hydro-sulfurous acid, said zone being an aqueous polymer suspension having a pH between from about 2 to 3, a monomer concentration of from about 1 to 10%, and a substantially constant quantity of polymer in the form of compact rounded discrete particles, said quantity being an amount of from about 19 to 40% by weight of the suspension, said zone being maintained under substantially steady state conditions, including a substantially constant temperature within the range of 20° C. to 70° C., the concentration of monomer in the feed being between about 28 and about 36% of the total weight of the continuous feed.

10. A process for producing a polymer which comprises continuously feeding, for polymerization, acrylonitrile into an agitated polymerization zone, said polymerization occurring in the presence of a catalyst comprising chloric acid and an oxidizable sulfoxy compound, said zone being an aqueous polymer suspension having a pH between about 1 and 4, and containing between 2 and about 50 parts per million of iron in solution, having a monomer concentration of from about 1 to 10%, and a substantially constant quantity of polymer in the form of compact rounded discrete particles, said quantity being an amount of from about 19 to 40% by weight of the suspension, said zone being maintained under substantially steady state conditions, including a substantially constant temperature within the range of about 20° C. to 70° C., the concentration of monomer in the feed being such as to maintain the amount of monomer and polymer in the polymerization zone substantially constant.

11. A process for producing a polymer which comprises continuously feeding, for polymerization, a mixture containing 95% by weight acrylonitrile and 5% by weight methyl acrylate into an agitated polymerization zone, said polymerization occurring in the presence of a polymerization catalyst, said zone being an aqueous polymer suspension having a monomer concentration of from about 1 to 10% and a substantially constant quantity of polymer in the form of compact rounded discrete particles, said quantity being an amount of from about 19 to 40% of the weight of the suspension, said zone being maintained under substantially steady state conditions, including a substantially constant temperature within the range of 20° C. to 70° C., the concentration of monomer in the feed being such as to maintain the amount of monomer and polymer in the polymerization zone substantially constant.

12. A process for producing a polymer which comprises continuously feeding, for polymerization, a mixture containing 95% by weight acrylonitrile and 5% by weight methyl acrylate into an agitated polymerization zone, said polymerization occurring in the presence of a reduction-oxidation polymerization catalyst, said zone being an aqueous polymer suspension having a pH between about 1 and 4, a monomer concentration of from about 1 to 10%, and a substantially constant quantity of polymer in the form of compact rounded discrete particles, said quantity being an amount of from about 19 to 40% of the weight of the suspension, said zone being maintained under substantially steady state conditions, including a substantially constant temperature within the range of 20° C. to 70° C., the concentration of monomer in the feed being such as to maintain the amount of monomer and polymer in the polymerization zone substantially constant.

13. A process for producing a polymer which comprises continuously feeding, for polymerization, a mixture containing 90% by weight acrylonitrile, 5% by weight methyl acrylate and 5% by weight allyl amine into an agitated polymerization zone, said polymerization occurring in the presence of a polymerization catalyst, said zone being an aqueous polymer suspension having a monomer concentration of from about 1 to 10% and a substantially constant quantity of polymer in the form of compact rounded discrete particles, said quantity being an amount of from about 19 to 40% by weight of the suspension, said zone being maintained under substantially steady state conditions, including a substantially constant temperature within the range of about 20° C. to 70° C., the concentration of monomer in the feed being such as to maintain the amount of monomer and polymer in the polymerization zone substantially constant.

14. A process for producing a polymer which comprises continuously feeding, for polymerization, a mixture containing 90% by weight acrylonitrile, 5% by weight methyl acrylate, and 5% by weight allyl amine into an agitated polymerization zone, said polymerization occurring in the presence of a reduction-oxidation polymerization catalyst, said zone being an aqueous polymer suspension having a pH between about 1 and 4, a monomer concentration of from about 1 to 10% and a substantially constant quantity of polymer in the form of compact rounded discrete particles, said quantity being an amount of from about 19 to 40% by weight of the suspension, said zone being maintained under substantially steady state conditions, including a substantially constant temperature within the range of about 20° C. to 70° C., the concentration of monomer in the feed being such as to maintain the amount of monomer and polymer in the polymerization zone substantially constant.

15. A process for producing a polymer which comprises continuously feeding, for polymerization, a mixture containing 90% by weight acrylonitrile, 5% by weight methyl acrylate, and 5% by weight allyl amine into an agitated polymerization zone, said polymerization occurring in the presence of a catalyst comprising chloric acid and an acid selected from the group consisting of sulfurous acid and hydrosulfurous acid, said zone being an aqueous polymer suspension having a pH from between about 2 and 3, a monomer concentration of from about 1 to 10%, and a substantially constant quantity of polymer in the form of compact rounded discrete particles, said quantity being an amount of from about 19 to 40% by weight of the suspension, said zone being maintained under substantially steady state conditions, including a substantially constant temperature within the range of about 20° C. to 70° C., the concentration of monomer in the feed being between about 28 and about 36% of the total weight of the continuous feed.

16. A process for producing a polymer which comprises continuously introducing, from a primary polymerization zone into a secondary agitated polymerization zone under an inert atmosphere, an aqueous polymer reaction mixture containing from about 1 to 10% of monomer comprising acrylonitrile and up to about 15% by weight of a different monoethylenically unsaturated compound, copolymerizable therewith, a polymerization catalyst and from about 19 to 40% by weight of polymer, subjecting said polymer reaction mixture to substantially steady state polymerization conditions, including a constant temperature within the range of about 20 to 70° C. and withdrawing a fluid aqueous suspension of polymer from said secondary polymerization zone, the rate of introduction of said polymer reaction mixture from said primary zone and of withdrawal of said fluid aqueous polymer suspension from said secondary zone being so regulated that the said secondary polymerization zone contains a substantially constant quantity of polymer, said substantially constant quantity being an amount of from about 19 to 40% of the weight of the polymer reaction mixture and said fluid aqueous suspension containing up to about 40% of polymer.

17. A process for producing a polymer which comprises continuously feeding constant quantities of a water-soluble polymerizable monomer composition containing between about 28 and about 36% monomer by weight and consisting of acrylonitrile and up to 15% by weight of a different monoethylenically unsaturated compound, copolymerizable therewith, polymerization catalyst and water into the re-circulation line of a polymerization reactor where they become admixed with re-circulating aqueous polymer suspension from said polymerization reactor to form a reaction mixture containing from about 1 to 10% of monomer composition, polymerization catalyst, and from about 19 to 40% by weight of polymer in the form of rounded discrete particles, passing said reaction mixture into said polymerization reactor where it is subjected to substantially steady state polymerization conditions, including agitation and a substantially constant temperature of from between about 20° C. and 70° C., re-circulating the aqueous suspension in said polymerization reactor through a heat exchanger and withdrawing fluid aqueous polymer suspension from said polymerization reactor, the rates of introduction of said reaction mixture and of withdrawal of said fluid aqueous polymer suspension being so regulated that the polymerization reactor contains a substantially constant quantity of polymer, said substantially constant quantity being an amount of from about 19 to 40% of the weight of the reaction mixture.

18. A process according to claim 17 wherein the reaction mixture is passed through a heat exchanger in the re-circulation line before it enters the polymerization reactor.

19. A process according to claim 17 wherein the fluid aqueous polymer suspension withdrawn from the polymerization reactor is introduced into an alkaline solution whereby the polymerization reaction is stopped.

References Cited in the file of this patent

UNITED STATES PATENTS

| | | |
|---|---|---|
| 2,436,926 | Jacobson | Mar. 2, 1948 |
| 2,475,016 | De Nie | July 5, 1949 |
| 2,496,222 | Kolvoort et al. | Jan. 31, 1950 |
| 2,496,384 | De Nie | Feb. 7, 1950 |
| 2,531,403 | Crouch et al. | Nov. 28, 1950 |
| 2,546,238 | Richards | Mar. 27, 1951 |
| 2,560,694 | Howard | July 17, 1951 |
| 2,628,223 | Richards | Feb. 10, 1953 |
| 2,654,731 | Patterson | Oct. 6, 1953 |